United States Patent [19]

Crimmins, Jr.

[11] Patent Number: 4,482,110
[45] Date of Patent: Nov. 13, 1984

[54] CYCLOROTOR COMPOSITE AIRCRAFT

[75] Inventor: Arthur G. Crimmins, Jr., Bozman, Md.

[73] Assignee: International Cyclo-Crane Licensing, A Virginia Partnership, Bozman, Md.

[21] Appl. No.: 207,076

[22] Filed: Nov. 14, 1980

Related U.S. Application Data

[63] Continuation-in-part of Ser. No. 910,186, May 30, 1978, abandoned.

[51] Int. Cl.$^3$ .............................................. B64B 1/32
[52] U.S. Cl. .......................................... 244/26; 244/27; 244/67; 416/99; 416/111
[58] Field of Search .................. 244/2, 3, 24, 26, 27, 244/30, 31, 67, 93, 6, 7 R, 7 A, 234, 236, 97, 96, 9, 127, 128; 416/99, 111

[56] References Cited

U.S. PATENT DOCUMENTS

| | | | |
|---|---|---|---|
| 1,189,138 | 6/1916 | Laisy | 244/67 |
| 1,430,393 | 9/1922 | Lynde | 244/127 |
| 1,519,866 | 12/1924 | Marchetti | 416/99 |
| 1,741,699 | 12/1929 | Hansen | 244/67 |
| 1,797,502 | 3/1931 | Hall | 244/97 |
| 1,817,074 | 8/1931 | Glessner | 244/7 R |
| 1,838,248 | 12/1931 | Bourland | 244/26 |
| 2,037,377 | 4/1936 | Gardner | 244/9 |
| 2,450,954 | 10/1948 | Hall | 244/97 |
| 3,185,411 | 5/1965 | Gembe | 244/97 |
| 3,350,956 | 11/1967 | Monge | 244/234 |
| 3,957,228 | 5/1976 | Kennedy, Jr. | 244/97 |
| 3,976,265 | 8/1976 | Doolittle | 244/26 |
| 4,114,837 | 9/1978 | Pavlecka et al. | 244/2 |

FOREIGN PATENT DOCUMENTS

| | | | |
|---|---|---|---|
| 141948 | 6/1803 | Fed. Rep. of Germany | 244/67 |
| 1481954 | 3/1969 | Fed. Rep. of Germany | 244/7 A |
| 1481944 | 5/1969 | Fed. Rep. of Germany | 244/15 |
| 792253 | 3/1980 | South Africa . | |

*Primary Examiner*—Galen L. Barefoot
*Attorney, Agent, or Firm*—Samuel V. Abramo

[57] ABSTRACT

A composite aircraft comprising a system of airfoils rotating about a horizontal axis providing lift and thrust in combination with a lighter-than-air gas containment bag providing bouyant lift; said aircraft being capable of lifting and transporting a load.

10 Claims, 22 Drawing Figures

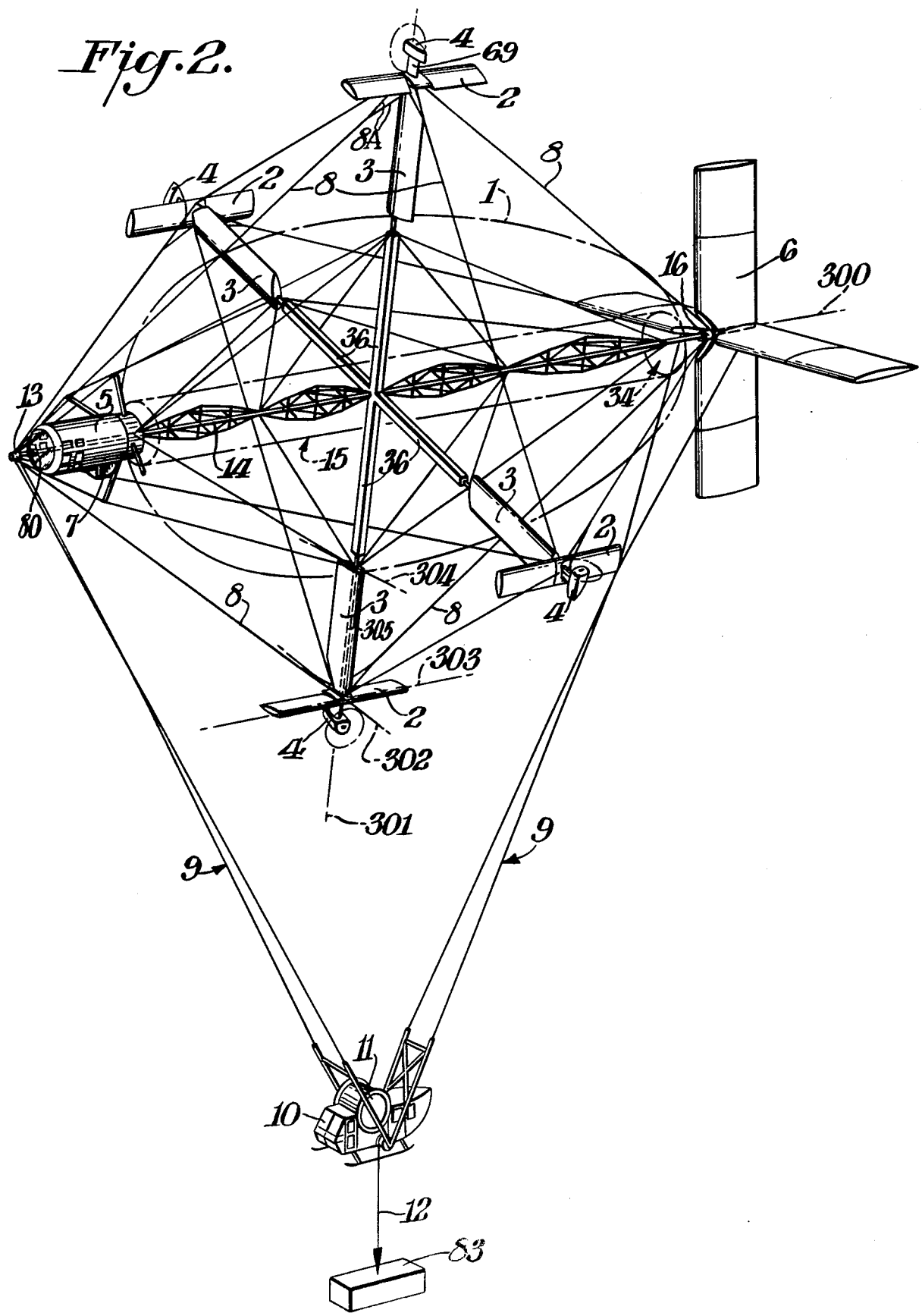

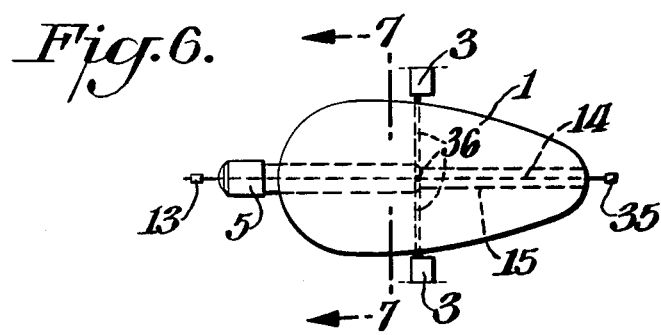

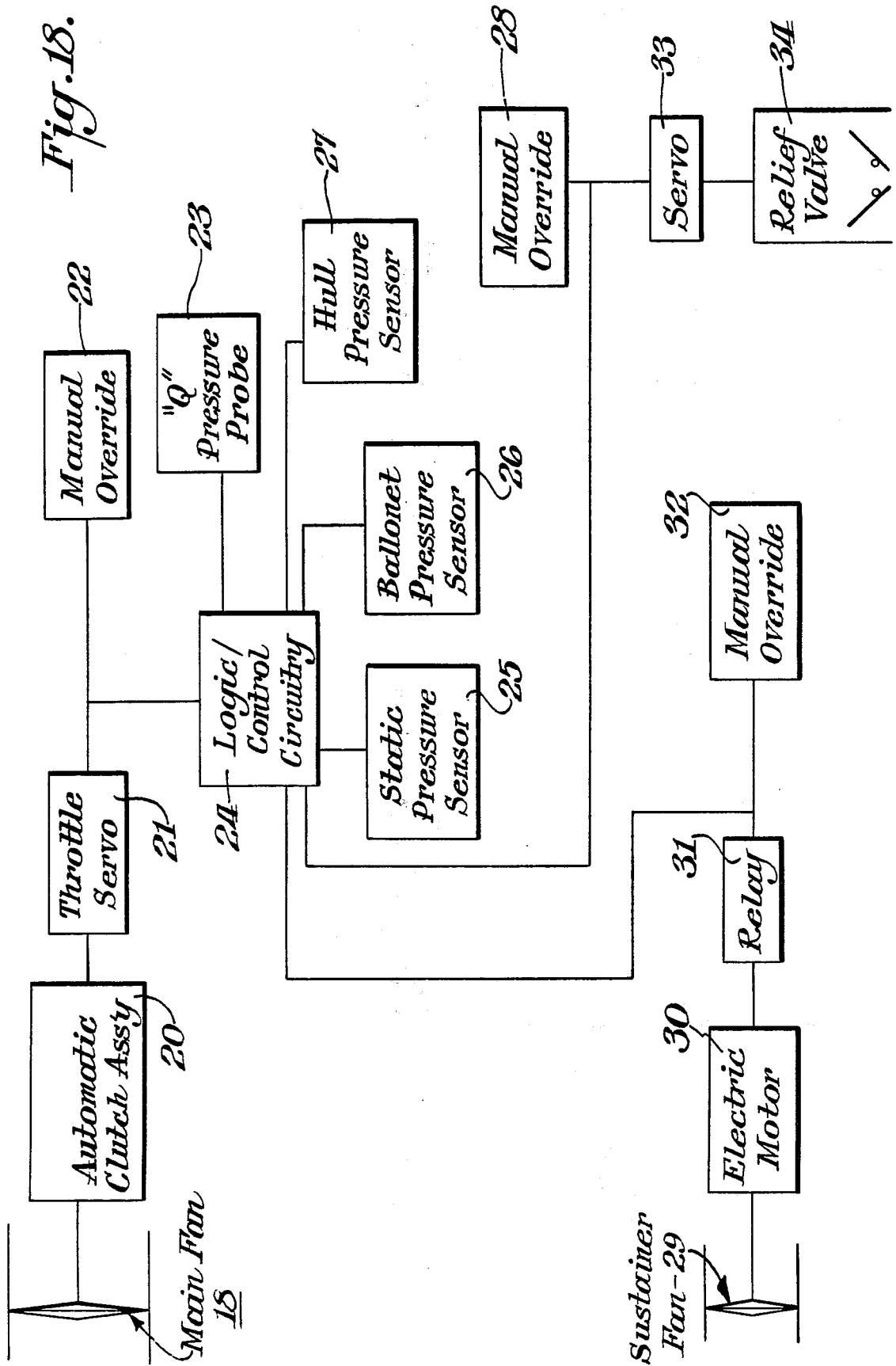

CYCLOROTOR COMPOSITE AIRCRAFT

CROSS-REFERENCE TO RELATED APPLICATIONS

This application is a continuation-in-part of my prior application, Ser. No. 910,186, filed May 30, 1978, now abandoned.

BACKGROUND OF THE INVENTION

1. Field of the Invention

This invention is directed to a composite aircraft comprising, in combination, a gas containment bag filled with lighter than air gas and wing components mounted on said aircraft to provide forces to augment or oppose aerostatic lift when said wing components ae propelled through the air by virtue of engines mounted thereon.

2. Description of the Prior Art

The need for aircraft capable of vertically lifting heavy weights is widespread and currently only partially met by helicopters which are limited to slingloads under 20 tons and are very expensive to operate. The herein disclosed invention offers a solution to the problem of ultra-heavy lift with adequate control and vehicle speed.

Previous attempts to solve this problem of ultra-heavy lift have included hybrid vehicles such as the aerocrane as disclosed in U.S. Pat. No. 3,856,236. This particular concept involves a vehicle with an essentially vertical axis that uses a large spherical centerbody with wings that act as helicopter rotors when the entire vehicle is rotated by virtue of engines and propellers mounted on the rotor blades. One of the major limitations on the forward speed of said vehicle is the advance ratio of the rotor, where the retreating blade airspeed must be maintained at a value so as to produce adequate lift, and thus the forward speed of the vehicle is limited by vehicle rotation.

The forward speed of a preferred embodiment of the present invention is not limited by vehicle rotation as said embodiment provides for nonrotating forward flight and also allows for translation under complete control while neutrally bouyant. These operations, i.e., control under neutral bouyancy and non-rotating flight, are not possible with the aircraft disclosed in U.S. Pat. No. 3,856,236.

Prior attempts to utilize a system of rotating airfoils to generate thrust vectors range from successful systems like the helicopter to efforts to rotate airfoil systems projecting from the aircraft in place of normal fixed wings such as taught in U.S. Pat. No. 2,633,311.

SUMMARY OF THE INVENTION

The herein disclosed invention comprises:

A primary structure orientated on a horizontal axis whereupon a plurality of airfoils are mounted, said airfoils including a means of thrust generation and provided with means to vary the angle of attack of said airfoils, said horizontal structure being in combination with and attached to means for the generation of bouyant lift.

The invention, more particularly, comprises:

1. A hybrid aircraft comprising in combination a lighter-than-air gas-containment envelope, a structure comprising wing airfoils, blade airfoils, thrust means, linkage means and control means operatively connected characterized as follows:

(a) a gas-containment envelope for lighter-than-air gas providing bouyant lift comprising an impermeable surface capable of retaining said gas with adequate strength to accept pressure and other leads thereon, said gas-containment envelope containing a volume of said gas with structure means for transferring the bouyant lift of said gas to said structure and capable of providing lift to said structure;

(b) a structure consisting of horizontal members, radial members, operatively connected, said radial members being mounted on the horizontal members in a plane ninety degrees to said horizontal members, said horizontal members being operatively attached to the gas containment envelope whereby the aerostatic lift of the gas contained within the gas containment envelope is transferred to the horizontal members;

(c) said wing airfoils being mounted by bearing and actuation means on the radial members whereby the wing airfoil span-wise axes may be oriented parallel to the horizontal members of the aircraft or whereby said wing airfoils may be rotated to position said span-wise axis of said wing airfoils, in a plane at ninety degrees to the horizontal members and whereby the angle of attack of said wing airfoils may be adjusted to vary lift;

(d) said blade airfoils being mounted by bearing and actuation means on the radial members with the blade airfoil span-wise axes in a plane at ninety degrees to the horizontal members and whereby said blade airfoils may be rotated to position the blade airfoil chord-wise axes at various angles relative to the radial members;

(e) said thrust means comprising a power source linked to aerodynamic reaction means mounted by bearing and actuation means on the radial members to pivot with said wing airfoils, a thrust means being paired with each wing airfoil and positioned so that the thrust vector from said aerodynamic reaction means is perpendicular to the axis of the radial members and is in a plane normal to said wing airfoil span-wise axes, whereby the direction of the thrust vector may be adjusted to provide rotation of the aircraft structure, specified in (a) to (e), about the horizontal axis of the aircraft and/or movement in the direction of the horizontal axes of the aircraft, and (f) control means operatively connected with the actuation means specified in (c), (d), (e) for adjusting said airfoils and said thrust means.

THE DRAWINGS

The following description of the preferred embodiment will be easily understood by one versed in the art when considered in conjunction with the drawings thereof wherein:

FIG. 2 is a pictorial view of the embodiment of the structural details of the embodiment of FIG. 1 with the gascontainment envelope bag and ballonet in phamton;

Figure 1:
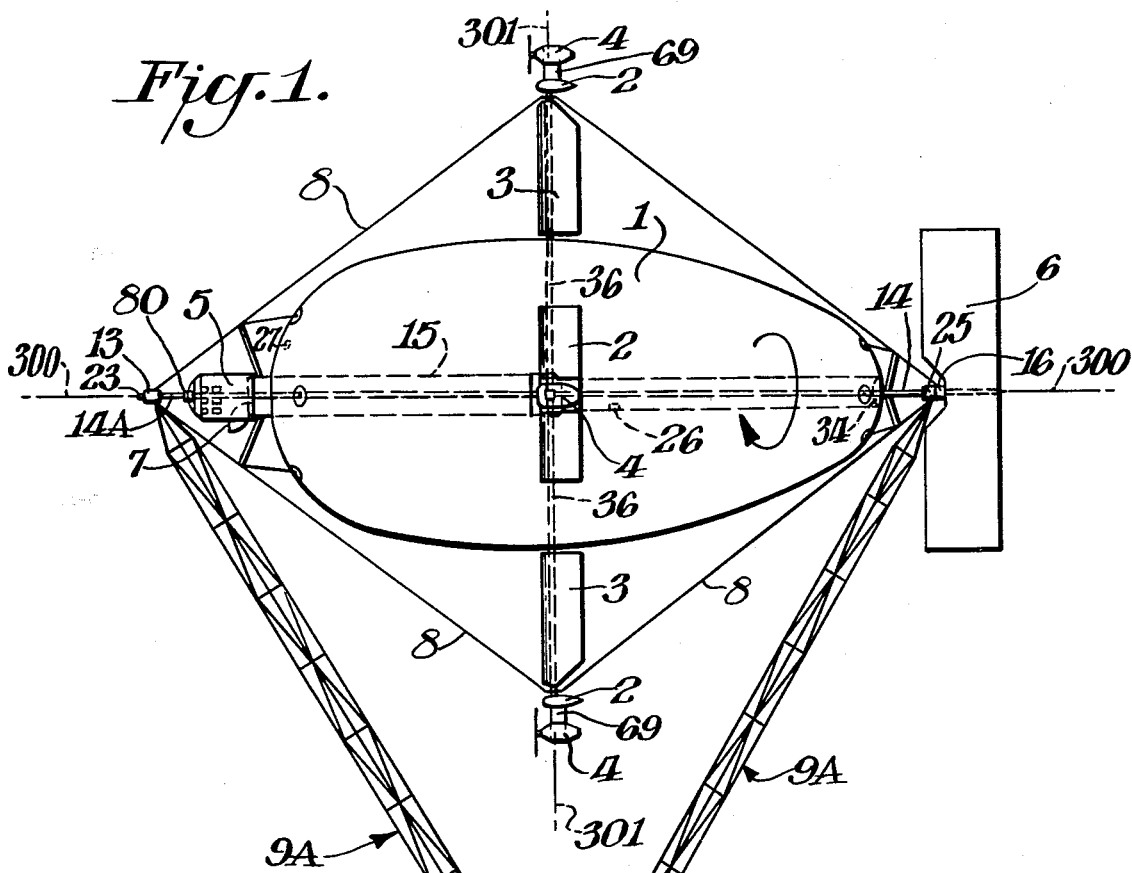
FIG. 1 is a side-elevational view of the preferred embodiment of the invention with wings and blades in full forward flightmode.
Figure 3:
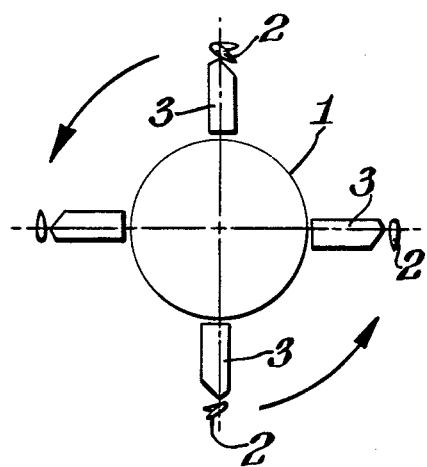
Figure 3A:
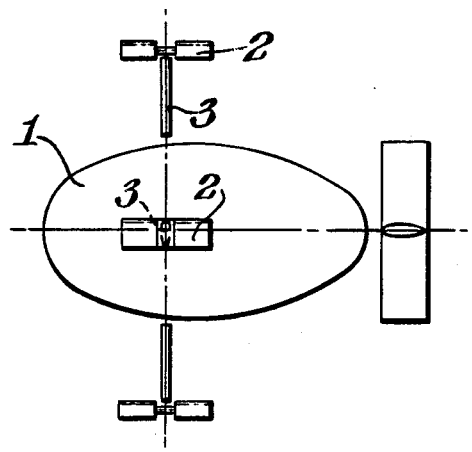
Figure 4:
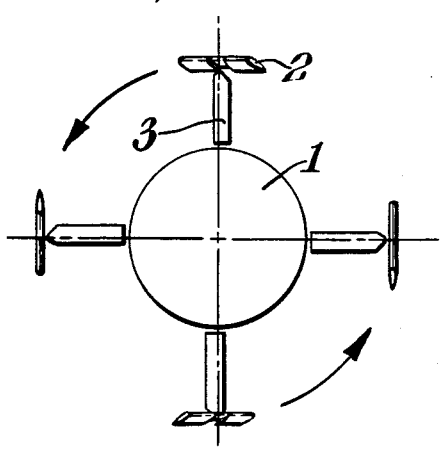
Figure 4A:
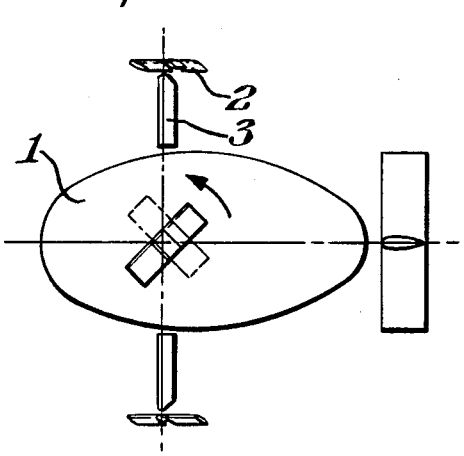
Figure 5:
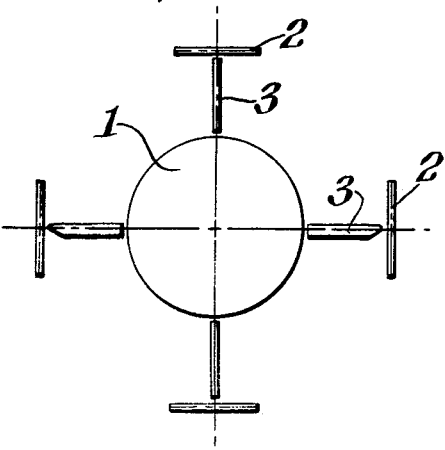
Figure 5A:
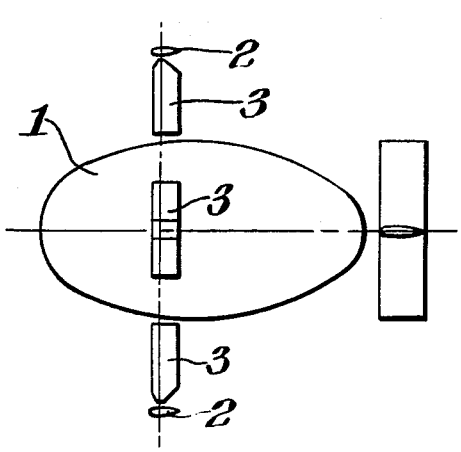
Figure 9:
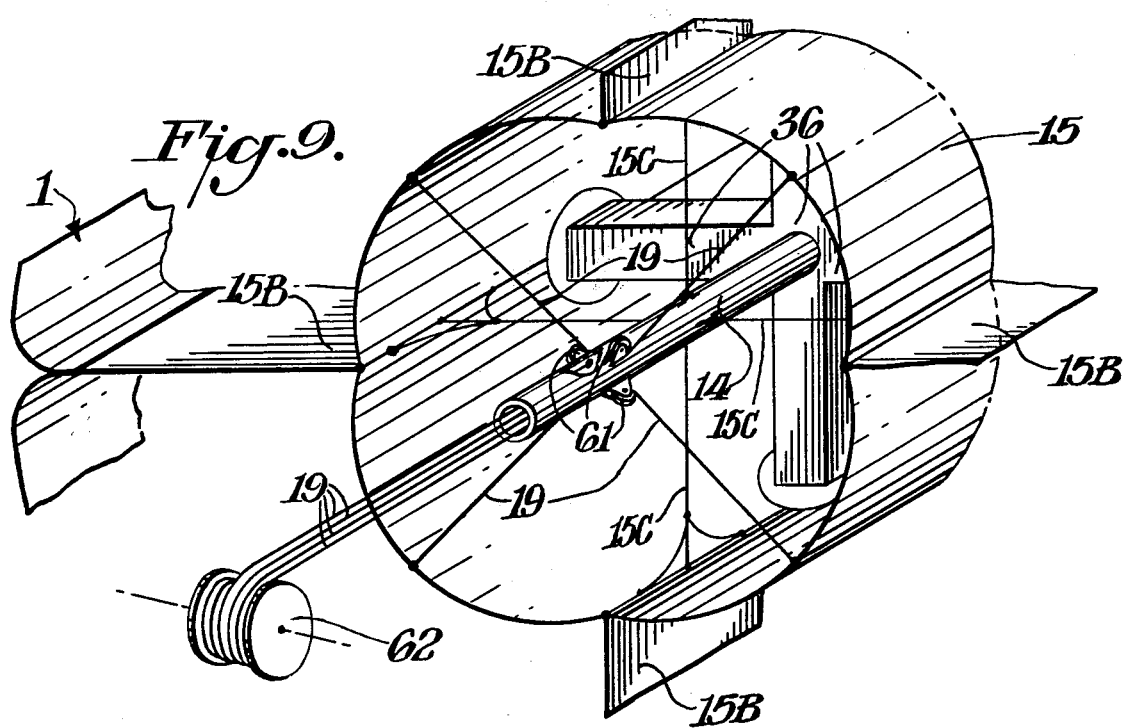
Figure 10:
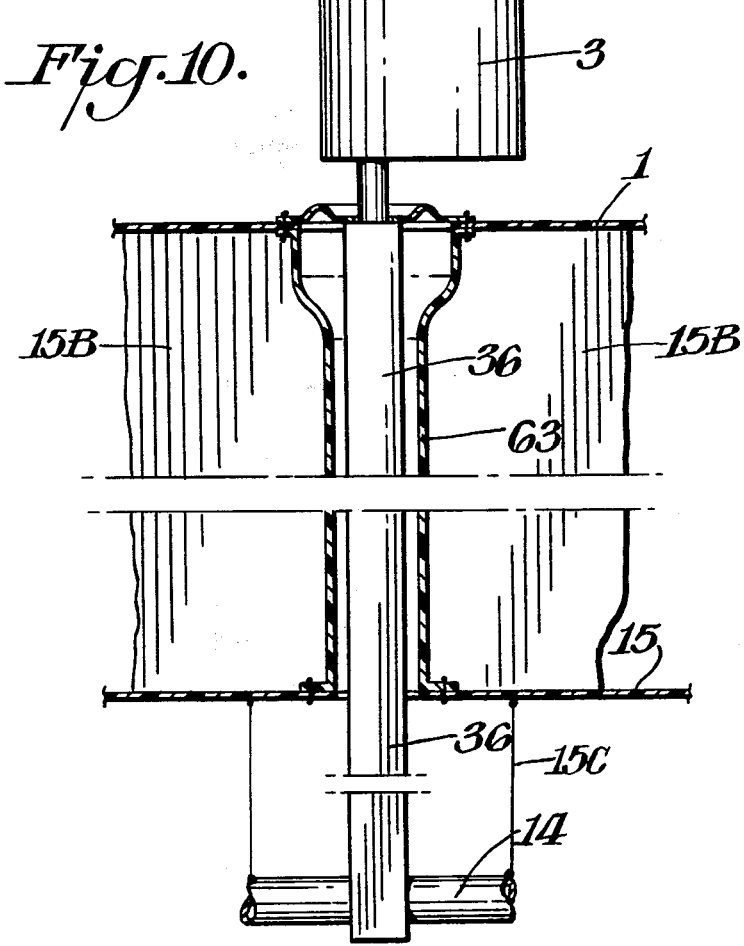
Figure 12:
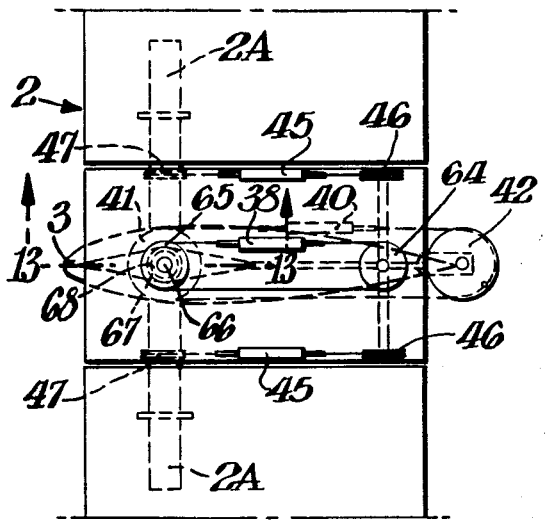
Figure 13:
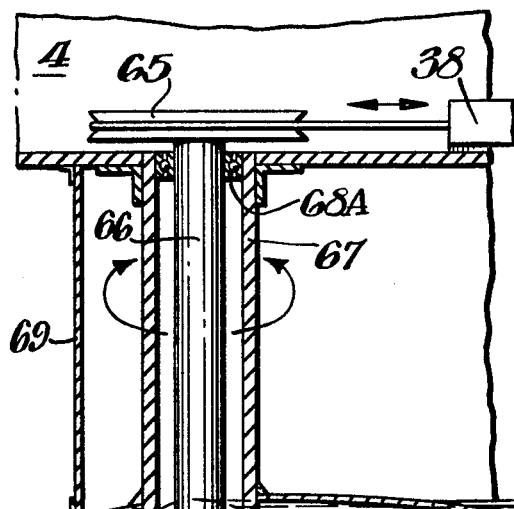
Figure 11:
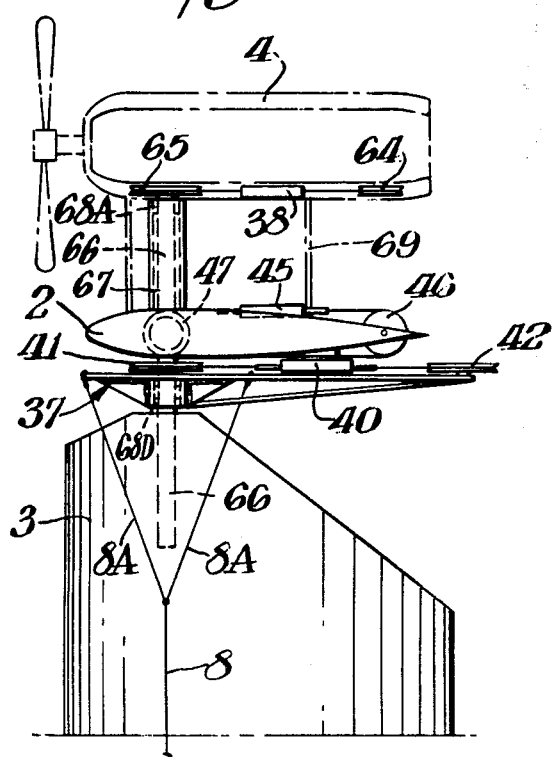
Figure 14:
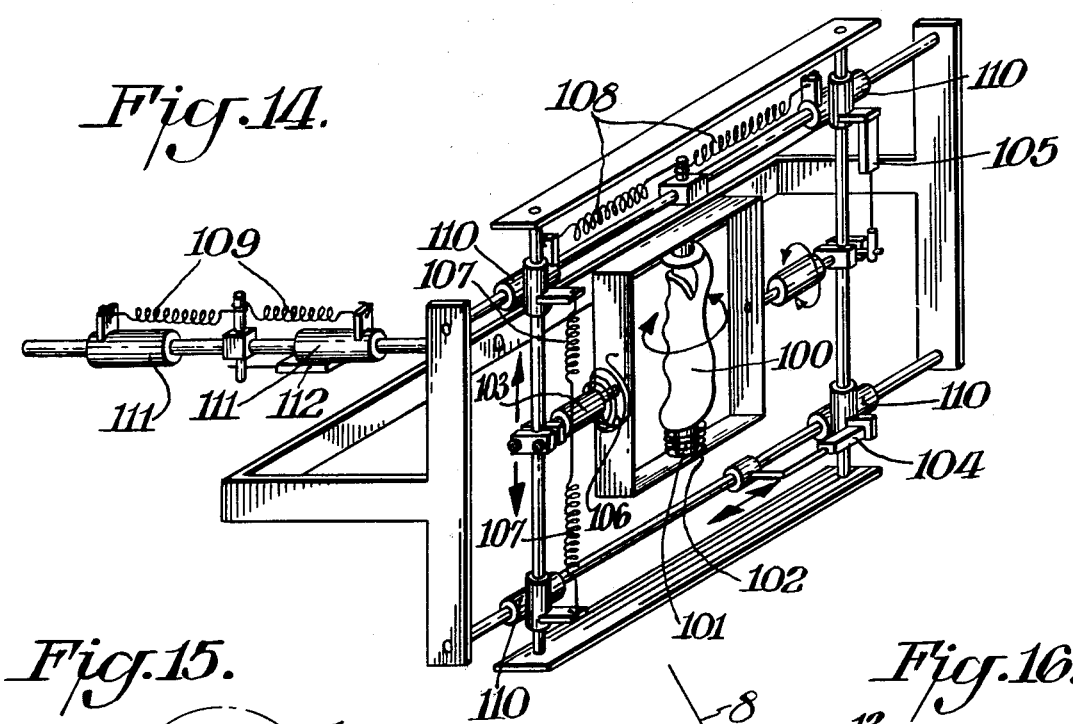
Figure 15:
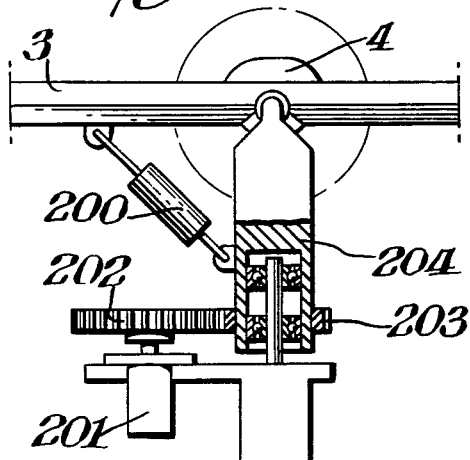
Figure 16:
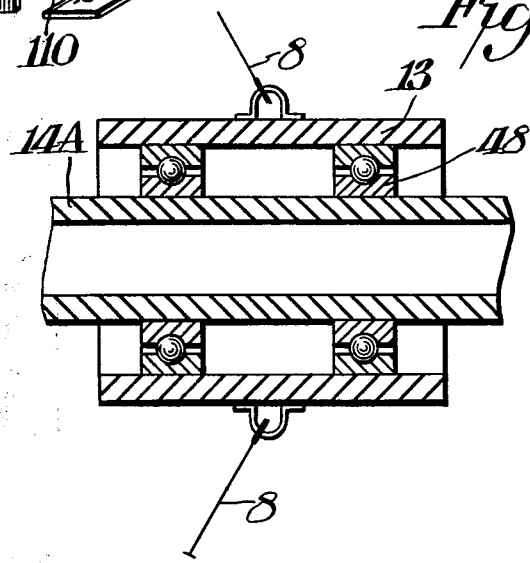
Figure 17:
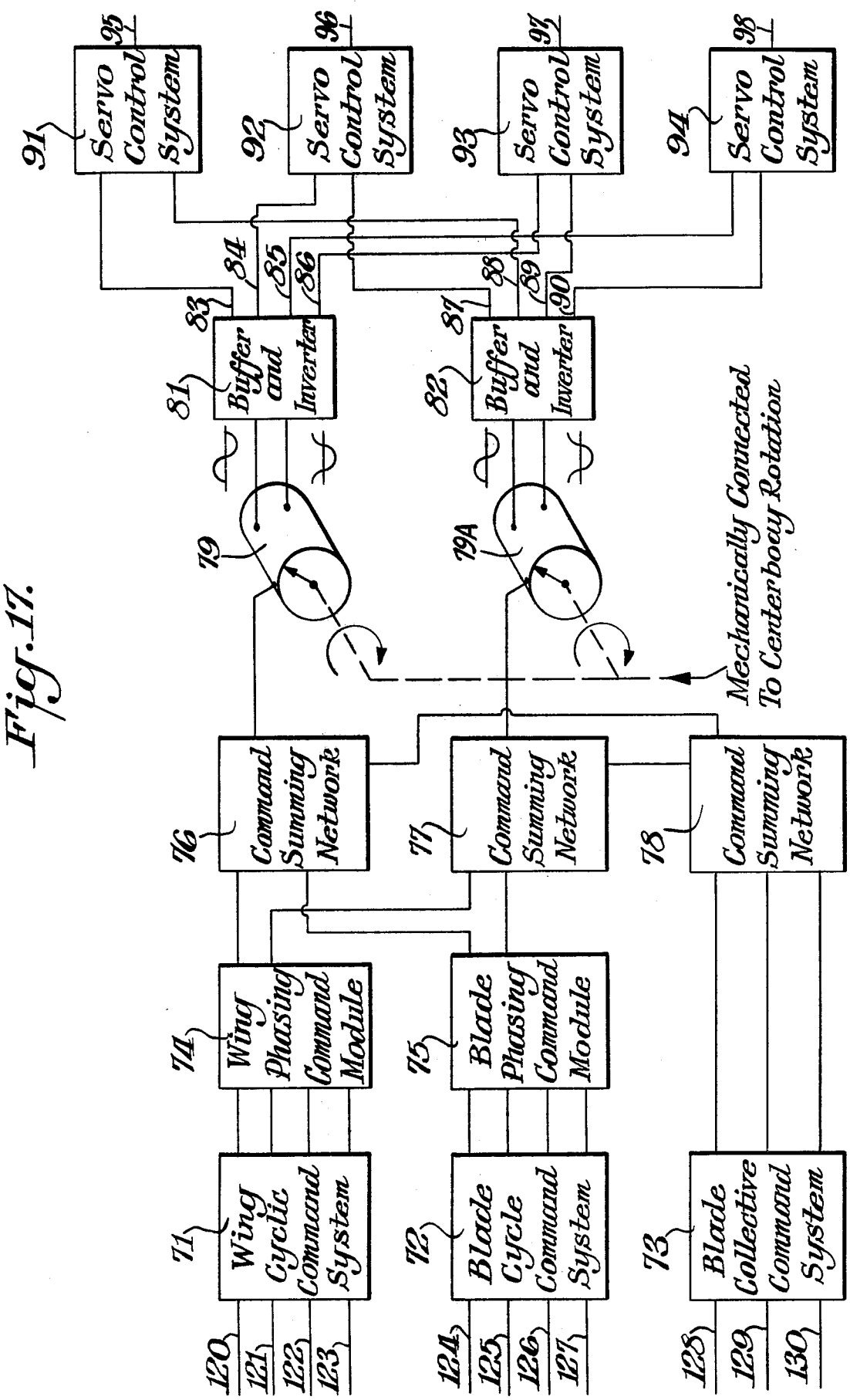

FIGS. 3, 4, and 5 are front elevational views of the embodiment of FIG. 1 showing various positions of the wings and blades in flight;

FIG. 3A is a side elevational diagrammatic view showing the positions of the wings and blades shown in FIG. 3;

FIG. 4A is a side elevational diagrammatic view showing the positions of the wings and blades shown in FIG. 4;

FIG. 5A is a side elevational diagrammatic view showing the positions of the wings and blades shown in FIG. 5;

FIG. 6 is a diagrammatic top plan view of an alternate embodiment with the tail section removed;

FIG. 7 is a diagrammatic cross-sectional view in elevation taken through FIG. 6 along lines 7—7;

FIG. 8 is a diagrammatic cross-sectional view of the ballonet in various stages of retraction;

FIG. 9 is a diagrammatic pictorial view illustrating the pulley system for retracting the ballonet;

FIG. 10 is a cross-sectional view in elevation of the boot seal structure between the ballonet and the gas containment bag;

FIG. 11 is a side-elevational view showing the drive system of the wing airfoil and blade structure shown in FIGS. 1, 2, 3, 4, 5, 3A, 4A and 5A;

FIG. 12 is a fragmented top plan view further showing the drive systems for the wing airfoils and blades of FIG. 11;

FIG. 13 is a cross-sectional view in elevation taken through FIG. 12 along lines 13—13;

FIG. 14 is a pictorial view of the hand control device which partially controls the direction of flight of the invention;

FIG. 15 is a fragmented diagrammatic view in elevation illustrating the wing airfoils showing wing bank actuation as an alternate method of generating a thrust vector in line with the horizontal axis;

FIG. 16 is a cross-sectional view of the forward bearing of FIG. 1;

FIG. 17 is a schematic block diagram showing the interconnection of the command, phase summing and servo control systems of the aircraft.

FIG. 18 is a schematic block diagram showing the ballonet pressure control system.

The invention will be understood by reference to the following description and the drawings. It will be appreciated that many combinations of the cyclorotor and number of bouyant gas-containment bags used are possible without departing from the basic invention which is the combination of cyclorotor or cyclorotors with said buoyant gas containment bags.

In a system of rotating airfoils wherein an inflow of fluid is experienced by the system, the angle of attack of the downstream foils must be controlled to accommodate this inflow and therefore must have different control inputs relative to the upstream foils if full efficiency is to be realized. The actual amount of differential angle between the upstream and downstream foils is dependent on several factors such as centerbody interference and advance ratios of the system. In order to achieve optimum cyclorotor performance, blade element and momentum theories must be considered for the upstream and downstream foils separately.

$$C_{XU} = \frac{X_L}{(\Omega R)^2 \frac{F}{2}} \quad (1)$$

defines the thrust coefficient for the upstream half of the cyclorotor while the downstream thrust coefficient is $$C_{XL} = \frac{X_L}{(\Omega R)^2 \frac{F}{2}} \quad (2)$$

wherein $F = 2Rs$, s is the length of airfoil. $C_{XL}$ plus $C_{XU}$ will yield the total thrust coefficient for the static case (hover) momentum theory yields $$C_{XL} = 0.667 \overline{V}_U^2 \quad (3)$$

for the upstream foils and $$C_{XL} = 0.667 V_L^2 + 1.18 \overline{V}_L \overline{V}_U \quad (4)$$

for the downstream foils. Blade element theory yields $$C_{XU} = \frac{A}{2}\left[ \delta_C - \frac{\overline{V}_U}{2} \right] \quad (5)$$

and $$C_{XL} = \frac{A}{2}\left[ \delta_C - \overline{V}_U - \frac{\overline{V}_L}{2} \right] \quad (6)$$

where
$\overline{V}_U$ = Peak amplitude of induced velocity produced by the upstream half of the cyclorotor divided by $\Omega R$,
$\overline{V}_L$ = Peak amplitude of induced velocity produced by the downstream half of the cyclorotor divided by $\Omega R$,
$C_{XU}$ = Thrust coefficient of the upstream half of the cyclorotor,
$C_{XL}$ = Thrust coefficient of the downstream half of the cyclorotor,
$\delta_C$ = The airfoil incidence angle due to the first harmonic cyclic control input, and
$\Omega$ = The rotational velocity in radians per second.
and $$A = \frac{bc}{4R} aw \quad (7)$$

where
b = number of foils
c = foil chord
R = radius of cyclorotor
aw = airfoil lift curve slope.

The important thing to note is that the downstream half of the cyclorotor detects the additional inflow $\overline{V}_u$, therefore the downstream half will produce a smaller thrust contribution than the upper half if a constant amplitude cyclic control signal $\delta_c$ is used for control of foil angle of attack.

Further, it can be seen that below a certain critical control angle $\delta_{ccrit}$, the lower half of the rotor will in fact be producing negative thrust. The critical control angle can be shown to be $$\delta_{Ccrit} = \overline{V}_U + \frac{\overline{V}_L}{2} \quad (8)$$

identified by the condition where $C_{XL} = 0$.

From an ideal rotor standpoint, that is, neglecting profile drag effects, $\delta_{ccrit}$ will be the operating point for maximum thrust/power ratio. For the preferred embodiment of the invention where A=0.65, $\delta_{ccrit}$ can be determined to be 0.24 radians or 13.9° with a corresponding $C_{XU}$ equal to 0.0394.

Non-ideal rotor operation in a viscous fluid with finite profile drag, in conjunction with optimal utilization of a given structural arrangement from both a performance and maneuvering standpoint, will dictate utilization of higher (than first) harmonic cyclic control inputs. Such higher inputs will result in differentials between the upstream and downstream foil control angles.

As the actual control differential between the upstream and downstream foils will be dependent on the specific combination of cyclorotor and buoyant support means utilized, the precise schedule of foil angles as a function of foil position in the plane of rotation must be computed by one versed in the art of aerodynamics for such specific combination.

Control of the cyclorotor can utilize a mechanical swash plate or, in the preferred configuration, an analog equivalent in electronic circuitry, for both wing and blade controls. Wing cyclic control provides thrust vectors in the plane of the cyclorotor and blade cyclic provides thrust vectors in planes coincident with the horizontal axis of rotation of the cyclorotor. Control of blade collective angle of attack provides a thrust vector in line with the horizontal axis of rotation. In the preferred configuration described herein, the controls interact for various reasons, e.g., gyroscopic reactions, and a mixture of control inputs is required to produce steady state values of specific vehicle functions. The following TABLE 1 indicates the control inputs required, as a function of the full value of the steady state value desired, for the various vehicle reactions.

TABLE 1

| To Achieve Steady State Values of: | Control Inputs Required | Forward Velocity in feet/second | | |
|---|---|---|---|---|
| | | 26 | 52 | 88 |
| Pitch Attitude | A | 1.0 | 1.0 | 1.0 |
| | B | 0 | 0 | 0 |
| | C | .31 | .69 | 1.0 |
| | D | 0 | 0 | 0 |
| Yaw Rate | A | −.8 | −.55 | −.45 |
| | B | 1.0 | 1.0 | 1.0 |
| | C | −.5 | −.73 | −.82 |
| | D | .1 | .36 | .73 |
| Vertical Velocity | A | −.24 | −.29 | −.29 |
| | B | −.24 | −.29 | −.29 |
| | C | .06 | .19 | −.38 |
| | D | 1.0 | 1.0 | 1.0 |
| Lateral Velocity | A | .24 | .29 | .29 |
| | B | −.24 | −.29 | −.38 |
| | C | 1.0 | 1.0 | 1.0 |
| | D | −.06 | −.19 | −.38 |

In Table 1, control input A references the blade cyclic command required in the appropriate plane coincident with the horizontal axis to produce a pitching moment, control input B references the blade cyclic command required to produce a yaw reaction, control input C references the wing cyclic command required to generate a lateral thrust vector in the plane of rotation of the cyclorotor, and control input D references the wing cyclic command required to generate a vertical thrust vector. Positive percentages in the above Table 1 refer to vertical, left and nose up pitch moments while negative percentages refer to downward, right and nose down pitch moments.

The preferred configuration of cyclorotor and aerostatic lift envelope is shown in the accompanying drawings and consists of a cyclorotor mounted at the major diameter of a two to one fineness ratio gas-containment envelope with a tail and forward support structure mounted on bearings with the cab and/or slingload support system supported by a cable system attached to said bearings. This design uses four sets of airfoil assemblies where each such airfoil assembly has two foils, the outer foils on each set designated as wings and the inner foil on each set designated as blades as these inner foils act as propeller blades in providing a thrust vector for forward flight. The length of wing and blade span are approximately equal to the radius of the largest cross-sectional diameter of the gas containment envelope. The airfoils have an aspect ratio of five to one.

The gas-containment envelope should have provision for variations in the lifting gas volume due to altitude or temperature change, in order to maintain a relatively constant pressure, and such provision can be a ballonet system, i.e., an internal air chamber capable of volume variation via direct connection to the external environment with pumping and valving means. The ballonet configuration can be as shown on FIGS. 1A, 7, 8 and 9. The volume of the ballonet should be in the area of fifteen percent of the contained volume of the gas-containment envelope to allow for adequate variations in altitude and temperature variations in actual operation of the vehicle.

Figure 1A:
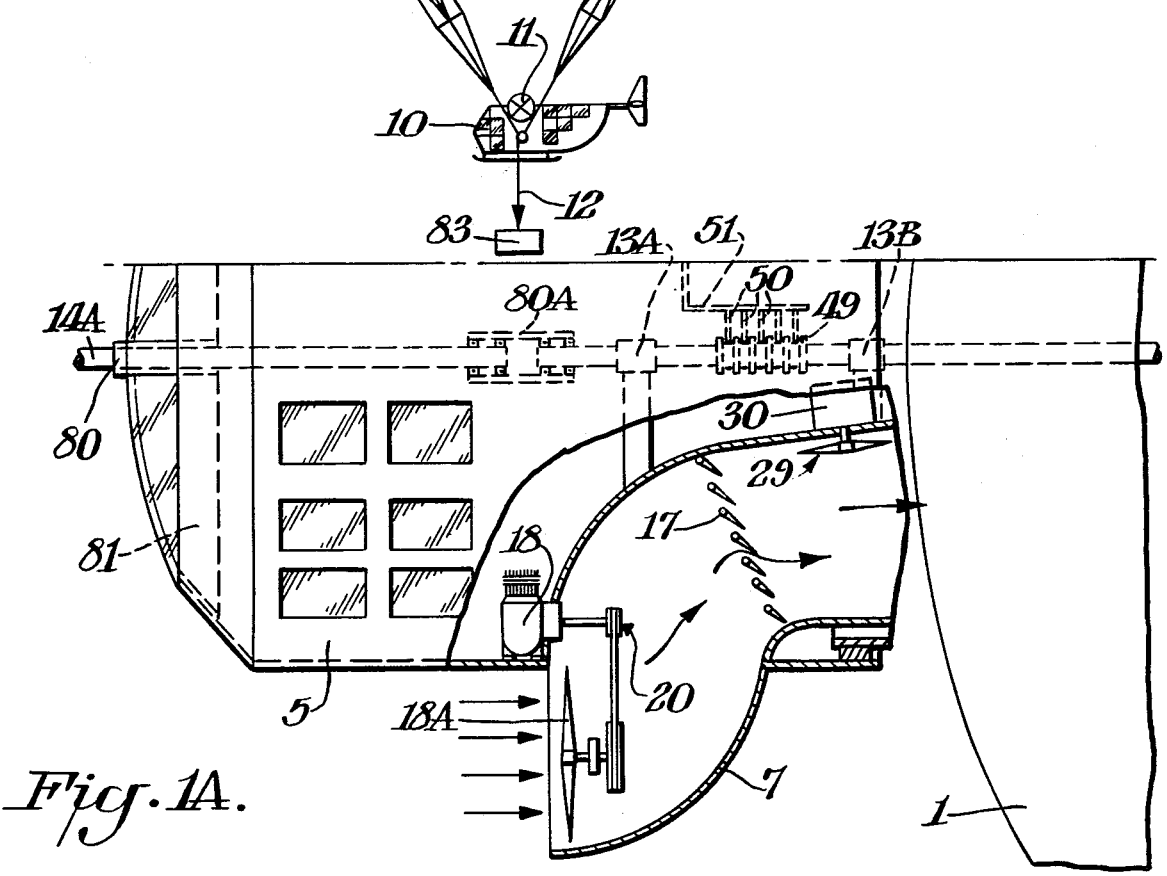
FIG. 1A is an enlarged fragmented view of the forward cabin and air scoop shown in FIG. 1.

The ballonet pressure control system is schematically illustrated in FIG. 9 and the ballonet blower and valve system shown in FIG. 1A.

In FIGS. 1, 1A, 2, 3, 4, 5, 3A, 4A, 5A, 6, 7 and 8:

1 is the gas-containment envelope;
2 are the wing airfoils;
3 are the blade airfoils;
4 are thrust means comprising a power source linked to an aerodynamic reaction means;
5 is the forward control cab
6 is the tail assembly
7 is the air scoop for the ballonet blower system;
8 are the main airfoil support cables;
8A are yoke cables attached between cables 8 and 37, blade/wing structural support member;
9 is the lower control cab/slingload cable support means;
9A is the lower control cab/slingload rigid support means;
10 is the lower control cab;
11 is the thrust means for controlling swing of the lower control cab;
12 is the slingload support cable carring a load 83
13 is the forward bearing shown in detail in FIG. 16;
13A is the middle forward cab, 5, attachment bearing;
13B is the rear forward cab, 5, attachment bearing;
14 is the main horizontal structural member;
14A is the horizontal forward control cab structural member;
15 is the ballonet air-containment envelope, expanded;
15A is the ballonet air-containment envelope, contracted;
15B are lengthwise permeable catenary curtain members attached to envelope 1 and cables 15C;
15C are cables attached between catenary curtain members 15B and horizontal member 14;
16 is the tail bearing assembly supporting the tail assembly 6 and to which is attached 9 and/or 9A;

17 is a one-way check valve for ballonet air retention;

18 is the engine to power the fan used for ballonet inflation;

18A is the main ballonet supply fan;

19 are the ballonet retraction cables;

20 is the gas engine automatic clutch assembly for engine 18;

21 is the ballonet engine throttle servo, FIG. 18;

22 is the manual override ballonet engine throttle;

23 is the sensor of external air pressure due to motion of the vehicle, i.e., "Q";

24 is the logic control circuit for ballonet pressure;

25 is the static air pressure sensor;

26 is the ballonet pressure sensor;

27 is the hull pressure (lifting gas) sensor;

29 is the electrically driven ballonet pressure sustaining fan;

30 is the electric motor for fan 29;

31 is the sustaining fan relay for fan 29;

34 is the ballonet relief valve;

36 are radial members in a plane at 90° to the horizontal axis 300;

37 is the blade/wing structural support member, also called the Yoke cable attachment member;

49 are conductive rings;

50 are brushes; and 51 is a brush support bracket;

61 are ballonet retraction cable pulleys;

62 is the drive for retracting the ballonet retraction cables;

63 is the boot which seals the gases within the gas-containment bag from the gas in the ballonet;

65 is the blade actuation pulley;

66 is the blade actuation shaft;

67 is the engine nacelle support member;

68A is the upper blade actuation shaft 66, bearing;

68B is the lower blade actuation shaft, 66, bearing;

68C is the upper yoke cable attachment member, 37, bearing;

68D is the lower yoke cable attachment member, 37, bearing;

69 is the fairing surrounding the engine support structure;

80 is the forward attachment for the forward control cab;

80A is the bearing for isolation of member 14 from 14A;

81 is a support member for attachment point 80;

83 is the load being transported;

302 is the chordwise axis of the wing airfoil;

303 is the spanwise axis of the wing airfoil;

304 is the chordwise axis of the blade airfoil;

305 is the spanwise axis of the blade airfoil;

300 is the horizontal axis of the aircraft;

301 is a vertical axis of the aircraft which is in a plane at 90° to the horizontal axis 300;

The spanwise axis of an airfoil is frequently referred to as the feathering axis of the airfoil.

In FIGS. 11, 12 and 13:

38 is the blade airfoil actuator;

39 is the stalk, defined as the combination of wing 2, blade 3 and supporting stricture 66 and 67, wings 2 and blade 3 have controlled motion with respect to the stalk 39;

40 is the stalk, 39, actuation cylinder;

41 is the stalk 39 actuation pulley; and 42 is the stalk 39 actuation idler pulley;

45 is the wing airfoil actuation cylinder;

46 is the wing airfoil idler pulley;

47 is the wing actuating pulley.

In FIG. 17:

120, 121, 122 and 123 are various inputs affecting the position of wings 2;

124, 125, 126, 127, 128, 129, 130 are various inputs affecting the position of blades 3;

71, 72 and 73 are mixing modules;

74 and 75 are command phasing modules;

76, 77 and 78 are summing networks;

79 and 79A are sine/cosine potentiometer systems;

81 and 82 are buffer and inverter networks;

91, 92, 93, and 94 are servo system electronics;

95, 96, 97 and 98 are outputs to hydraulic servo valves.

The preferred form of the invention is shown in FIG. 1 where the gas-containment envelope 1 and the cyclorotor portions consist of wings 2 and blades 3 and aircraft engines 4 consisting of propeller driven engines. Wings 2 and blades 3 are externally braced with cables 8 to the main horizontal structure 14 on which are mounted bearings 13 and 16, fore and aft. A pilot compartment 5 is located forward with airscoop 7 provided to supply ram air in support of the ballonet supply fan 18. A lower cab 10 supported by either a rigid structure as 9A of FIG. 1 or cable means 9 as in FIG. 2 and is equipped with a means of aerodynamic thrust system 11 to control cab movement. This thruster 11 is a simple engine or motor driven variable pitch propeller under direct or automatic control to counter any tendency of the cab 10 to sway. The sling load 83, which is located below the lower cab can be raised or lowered by a winch.

The ballonet system is provided and mounted around the main horizontal member 14 as shown in FIG. 6. The ballonet containment envelope 15 is shown in FIG. 7 as fully expanded and as 15A fully retracted. This ballonet system is shown in FIG. 7 and depicts the use of catenary support members 15B as the mounting for the ballonet sections. Ballonet retraction cable is attached to the center of each ballonet quadrent on appropriate centers and then attached to the retraction system (FIG. 9) consisting of winch and pulley arrangements. FIG. 8 shows various stages of ballonet retraction. The pressure of the ballonet system is maintained approximately 1" of water over the pressure of the hull (lifting gas) pressure by a control system shown in FIG. 18 wherein the engine 18 driving the main ballonet air supply fan 18A is controlled by either logic circuit 24 or manual override control 22 to hold the ballonet pressure higher than the hull pressure, and said hull pressure is established to be slightly higher than the force of air being experienced by the hull ("Q") as measured by sensor 23 and compared by logic circuit 24 to the static air pressure as measured by sensor 25. When only small ballonet volume changes are to be accommodated, an electric motor 30 drives a fan 29 through actuation of relay 31. Servo 33 opens relief valve 34 as required to assist in controlling ballonet pressure.

The preferred configuration of cyclorotor and bouyant lift means illustrated herein operates in hover as shown in FIG. 2 wherein the wings 2 are orientated with their spanwise axis parallel to the main horizontal structure 14 and the engines 4 force a rotation of the entire cyclorotor and gas-containment envelope about the horizontal axis with the bearings isolating the tail 6, cables 9, cabs 5 and 10 with slingload support cable 12 from this rotation. The cyclorotor control system actuates the wings 2 in a cyclic manner to produce a vector in the plane of rotation of the cyclorotor.

In this preferred configuration, the total lift from the contained lighter-than-air gas is approximately equal to all of the structural weight of the vehicle plus 50% of the slingload specification, thus the cyclorotor wing thrust is negative (downward) when the vehicle is flying without a load and positive (upward) when supporting a full slingload.

When forward (or rearward) movement is desired, the cyclorotor control system applies blade 3 collective as shown in FIG. 4 to generate a thrust vector in line with the horizontal axis of the vehicle. The blade control system is referenced to the thrust line of the engines 4 but said blade control system is capable of independent alignment (via cylinder 38 in FIGS. 11 and 12) as regards the engine thrust line thus allowing the engine thrust line to always remain directly alligned with the relative wind for maximum efficiency. This relationship of relative wind to spanwise axis of the wings is maintained by cylinder 40 in FIG. 11. Cylinder 38 actuates pulley 65, thereby rotating shaft 66 to which the blade airfoils are attached. Actuation of cylinder 40 without actuation of cylinder 38 will change the blade angle of attack. Actuation of cylinder 38 changes the blade airfoil 3 angle of attack relative to the stalk 39 chordwise. Thus cylinder 38 can change the chordwise axis of the blade airfoil 3 relative to the chordwise axis of wing airfoil 2. The rate of rotation, either clockwise or counterclockwise that, depending on the slingload specification, and therefore, size of the vehicle is between 8 and 13 RPM, and is reduced as the vehicle moves forward with the goal of maintaining a constant air speed over the wings, and the main throttle control system for the engines 4 may be automatically controlled to achieve this goal. Basic engine alignment may also be automatically controlled to stay pointed directly into the relative wind. As the vehicle continues to accelerate, the engine thrust line eventually becomes parallel with the horizontal axis of the vehicle and, therefore, the direction of flight, and all rotation of the cyclorotor stops in this condition of full forward flight as shown in FIG. 1. It is not necessary to completely stop cyclorotor rotation as some residual rotation may be desired.

The entire wing and engine assembly shown in FIG. 12 is mounted on structural support 37 that allow rotation via bearings 68A, 68B, 68C and 68D. This rotation is controlled by cylinder 40 and pulley 42. In nonrotating forward flight, this rotation of the wing assembly allows for a ninety-degree change in wing orientation to a point where the spanwise axis of the wings are in the plane at ninety degrees to the horizontal axis of the aircraft and the wings thus provide lift in a manner normal to all fixed wing aircraft.

Each of the wings 2 include means for modification of the angle of attack. The entire wing can be rotated by means of cylinders 45 acting on shaft 2A through pulley 47 around the spanwise axis.

FIG. 16 illustrates the front bearing assembly 13 isolating the form where the forward control cab support member 14A from cables 8 are isolated from rotation of the horizontal structural member 14 by bearings 80A.

The slipring assembly is shown in FIG. 1A and consists of conductive rings 49 mounted on a non-conducting fixture, with these sliprings in contact with brushes 50. The brushes 50 are mounted on bracket 51 that is secured to the forward cab structure 5.

The control means allow the pilot, or, the operator if remotely controlled, to control the direction and speed of the aircraft by a handgrip-type control mechanism of the type shown in FIG. 14 mounted so as to allow a direct correlation between pilot command (movement of the handgrip) and the actions of the vehicle. Raising or lowering the handgrip will command the generation of the cycloidal wing command signal with the proper phase orientation to produce positive or negative lift in a vertical plan, with the amplitude of the signal proportional to the degree of handgrip displacement from the neutral position. In the preferred form of the invention, the altitude of the vehicle will be automatically held by a standard aircraft altimeter system, e.g., radar, barometric or laser, and the upward or downward movement of the handgrip by the pilot will be fed as an error signal to this system. A neutral position of the handgrip will be a command for the altimeter control system to maintain the instant altitude of the vehicle.

Movement of the handgrip to the left or right will act to generate a wing cycloidal signal with the proper phase orientation to produce a thrust from the wing system in a horizontal plate at ninety degrees to the main (horizontal) axis of the vehicle. The amount of thrust so generated will be a function of the degree of displacement of the handgrip from the neutral position of the handgrip.

Twisting the handgrip left or right, or rocking the handgrip in a vertical plane that cuts the horizontal axis of the vehicle will act on the blade cyclic control or the wing banking control of FIG. 15 in a cyclic command basically derived from the sine wave generated by potentiometers 79 and 80 of FIG. 17 and will react with the altitude and attitude control system outlined above.

Fore and aft movement of the handgrip will be a command to the blade collective control system for generation of a force in line with the horizontal axis of the vehicle via collective blade command and will also command spanwise rotation of the wing/engine system into the desired flight direction. Orientation of the spanwise axis of the wings can be automatically controlled by a reference to the relative wind direction being experienced by the wings so that a sensor will detect the relative wind direction and rotate the spanwise axis of the wings via cylinder 40 to a point where this axis is at ninety degrees to the relative wind direction.

A method of incorporating this control system into a single handgrip is schematically shown in FIG. 14.

The handgrip 100 can be twisted left or right and will move the wiper of the potentiometer (hereinafter abbreviated "pot") 101 to feed an error signal into a standard gyrocompass azimuth control system. If no pressure is applied by the pilot, the spring 102 will keep the handgrip centered and the gyrocompass control system will keep the vehicle on a given heading.

If the handgrip 100 is rotated by the pilot so as to "point" up or down, i.e., the handgrip is rotated in a vertical plane that cuts the horizontal axis of the vehicle, this rotation is sensed by the pot 103 and an error signal is introduced into the gyro control system that maintains the vehicle in a level attitude, with the result that the vehicle will pitch up or down. If no rotational force is applied to the handgrip, the spring 106 holds the handgrip assembly in a neutral position and the vehicle will be automatically held level by the gyro system.

If the handgrip is moved to the left or right, the pot 104 will sense this motion as the entire inner handgrip assembly slides sideways on the bearings 110. This movement acts to shift the phase of the cycloidal wing command signal and to cause the wings to generate a side force proportional to the distance the handgrip is moved sideways. With no sideways pressure, the handgrip assembly will be held in a neutral position by the spring assembly 108.

If the pilot lifts the handgrip up or pushes it down, pot 105 changes the wing cycloidal signal to change the altitude of the vehicle. A servo system based on the output of a standard aircraft altimeter is used to control the altitude of the vehicle by applying a signal to the wing cycloidal system to hold or change vehicle altitude based on pilot command. Movement of the handgrip 100 up or down changes resistance of pot 105 and therefore acts to introduce an error signal into an altimeter control loop and the wing cycloidal command signal will change to command a climb or descent. If no up or down pressure is placed on the handgrip, no altitude change will occur as the spring system 107 will hold the handgrip in a neutral position.

Movement of the handgrip 100 forward or rearward moves the entire assembly relative to the fixed bearings 111 and the pot 112 acts on the collective blade control to provide either a forward or rearward propulsive horizontal force. No force on the handgrip will keep the handgrip assembly in neutral by the action of the spring assembly 109.

If external ground relative signals are available or an internal inertial platform is used for "dead reckoning," these signals can be used to allow the neutral position of the handgrip grip control to be used as a fixed point in space relative to the ground and pilot inputs used as error signals against such position signals. Such systems are well known to those versed in the art.

The preferred control system is based on a direct analog to standard helicopter control systems. In a helicopter system a mechanical swash plate can be positioned (tilted) by the pilot for a cyclic angle of attack command and/or a collective (common) angle of attack can be established on all airfoils. While it is possible to construct a virtual duplicate of existing helicopter mechanical control system for this vehicle a more effective method is to use electronics for this purpose in the herein described invention.

A block diagram of the electronic control system is shown in FIG. 17. Potentiometers 79 and 79A are electronic equivalents to the mechanical swash plates of a helicopter. Standard sine/cosine potentiometers 79 and 80 are mounted on the nonrotating assembly supporting the cab and slingload assembly (5, 9, 10, etc on FIG. 1) with the wipers of these potentiometers driven by the rotating centerbody assembly (1 of FIG. 1). This arrangement parallels normal helicopter systems in that the wiper positions of the sine/cosine potentiometers 79 and 80 establish the reference point for the pilot (or other control) command exactly in the manner of a standard mechanical swash plate system wherein the outer portion of the swash plate system rotates with the helicopter rotor (analogous to the wiper of the sine/cosine potentiometers 79 and 79A rotating with the centerbody) while the inner portion of the swash plate (isolated from rotation by a bearing) is fixed relative to the pilot (analogous to the mounting of the sine/cosine potentiometers 79 and 80 on the nonrotating cab support system).

It is important to note that this method of control orientation maintains a constant reference point, i.e. a constant relationship between rotary and nonrotary systems, for control inputs regardless of rotation. For example, in hover when the herein disclosed invention is rotating, a command to generate a vertical lift vector is translated into a wave form wherein a maximum angle of attack exists on the upper and lower wings 2, while the two side wings have a zero angle of attack. Because of the nature of this cyclic input, each wing will assume the command angle of attack at each angular postion. This will be true regardless of whether the vehicle is rotating (hover) or not the wing system will establish the correct angle of attack from each wing as determined by the position of each wing relative to the sine/cosine potentiometers of 79 and 79A.

The wing command signals are shown in FIG. 17 as entering the command authority and mixing module, item 71. There are four possible wing command signals, 120, manual pilot command, 121, trim command, 122 altitude command and 123 lateral ground position command. The manual pilot command input on 120 is generated by summing the values of potentiometers 104 and 105 of FIG. 14.

The trim command input 121, is generated by a standard potentiometer (not shown) located near the pilot.

In the preferred form of the invention, an electrical signal derived from an altitude sensing system (such as the aircraft auto pilot system Century II manufactured by Edo-Aire Mitchel, Mineral Wells, Tex.) is used as input. In this system, the potentiometer 105 of FIG. 14 is linked to the auto pilot system to introduce an error signal whereby the output signal from the autopilot (introduced into block 71 of FIG. 17 via input 122) will command the appropriate wing angle of attack to meet the demand of the autopilot altitude system.

In the preferred form of the invention, a ground position system is used such as the Hastings Raydist System, manufactured by the Hastings Raydist Company, Hampton, VA. The electrical output from this system is proportionate to the actual ground position of the vehicle. In this preferred system for lateral ground relative positioning, potentiometers 104 of FIG. 14 would modulate the output signal from the Hastings Raydist system and this modulated signal would be applied via input 123 to block 71 of FIG. 17.

The blades 3 (FIG. 1) have a cyclic command requirement for yaw and pitch control. For manual control, signals from potentiometers 101 and 103 (FIG. 14) are summed and fed via input line 124 to block 72 of FIG. 17. In the preferred form of the invention, the yaw and pitch control output signals from the above-mentioned auto pilot system are fed via input lines 126 and 127, respectively, and potentiometer 101 (yaw) and 103 (pitch) act on the autopilot system to establish a given attitude which is then automatically maintained via the output of the autopilot and the input, 126 and 127, to the blade cyclic command system.

The blades 3 also have a collective capability, that is, all blades may be adjusted to a common angle of attack. This adjustment is fully analogous to the collective requirement of a helicopter and can be achieved in exactly the same manner mechanically but in the preferred form of the invention the collective blade angle is established by suitable electrical bias on the sine/cosine electrical analog to the mechanical swash plate system of the helicopter. In hover, blade collective provides a thrust vector directly in line with the horizontal axis of the vehicle. Thus, this thrust vector is the means of forward (or reverse) acceleration from the hover mode. In the preferred form of the invention, potentiometer 112 of FIG. 14 provides the manual pilot command to block 73 via input line 128 on FIG. 17.

If a ground position sensing system is in use as is required in the preferred form, blade collective is the fore and aft ground station positioning mechanism. In use, the pilot's command interacts with the Hastings Raydist system mentioned above and the output from this system is fed to block 73 via input line 130. In use, a "hands off" situation, i.e., no pilot input and the handgrip of 100 of FIG. 14 at rest and centered by virtue of springs 102, 106, 107, 108 and 109 no signals will be received by the autopilot or the Hastings Raydist systems and thus position in space defined as a level, constant heading, constant altitude and fixed position (relative to a ground station) will exist with automatic compensation for the effects of wind or gusts.

The blocks 71, 72 and 73 of FIG. 17 contain electronic mixing systems that select the desired input, e.g, pilot's manual command or other, and mix the inputs. All systems shown in blocks are well known to those versed in the art.

Blocks 74 and 75 of FIG. 17 are the command phasing systems wherein the proper phase signal is selected and provided, via command summing systems 76 and 77 to the sine/cosine generators 79 and 79A. The output from the sine/cosine generators is a wave form proportional to the input command signals and this wave form, properly phased by the buffer and inverter networks, 81 and 82, is then fed to the servo control systems, 91, 92, 93, and 94. Outputs 95, 96, 97 and 98 go directly to electro hydraulic servo valves and cylinders similar to Moog (Moog, Inc., of East Aurora, N.Y.) systems using #A 076-102 valves.

It is obvious that a fully digital system could be used in place of the analog electronics described above without departure from the herein disclosed invention.

The blade airfoils 3 exist to provide a force vector in line with the horizontal axis of the aircraft. An alternate method of generating such a force vector is shown in FIG. 15, whereby the wings 2 are rotated about their chordwise axis by cylinder 200 while the wings 2 are rotated about their spanwise axis by virtue of the action of motor 201 acting through gears 202 and 203 on support shaft 204.

Fuel for the thrust means may be carried in tanks within the gas containment bag or alternatively may be stored in the wing and blade airfoils.

This invention is directed to the cyclorotor moiety of this invention which is a means capable of providing aerodynamic lift and thrust. The cyclorotor is a novel combination of wing airfoils, blade airfoils and rotation means each having means for rotation or pivoting described above. The cyclorotor consists of at least one pair of wing airfoil, blade airfoil and rotation means positioned on a support member such as 36 of FIG. 1., said support member being capable of being pivoted rotatably about its midpoint. Preferably 3, 4, 5, 6, 7, 8 or more sets of wing airfoils and blade airfoils are used. Rotation of the cyclorotor produces thrust vectors by virture of aerodynamic forces on the airfoils.

It is known that there are many ways of varying the angle of attack of an airfoil. Airfoils may be rotated or a portion thereof, flaps, may be rotated to vary the angle of attack.

I claim:

1. A hybrid aircraft comprising in combination a lighter-than-air gas-containment envelope, a structure comprising wing airfoils, blade airfoils, thrust means, linkage means and control means operatively connected characterized as follows:

(a) a gas-containment envelope for lighter-than-air gas providing bouyant lift comprising an impermeable surface capable of retaining said gas with adequate strength to accept pressure and other leads thereon, said gas-containment envelope containing a volume of gas with structure means for transferring the bouyant lift of said gas to said structure and capable of providing lift to said structure;

(b) a support structure consisting of horizontal members and radial members, operatively connected, said radial members being mounted on the horizontal members in a plane ninety degrees to said horizontal members, said horizontal members being operatively attached to the gas-containment envelope whereby the aerostatic lift of the gas contained within the gas-containment envelope is transferred to the horizontal members;

(c) said wing airfoils being mounted by bearing and actuation means on the radial member whereby the wing airfoils span-wise axes may be oriented parallel to the horizontal members of the aircraft or whereby said wing airfoils may be rotated to position said span-wise axis of said wing airfoils in a plane at ninety degrees to the horizontal members and whereby the angle of attack of said wing airfoils may be adjusted to vary lift;

(d) said blade airfoils being mounted by bearing and actuation means on the radial members with the blade airfoils span-wise axes in a plane at ninety degrees to the horizontal members and whereby said blade airfoils may be rotated to position the blade airfoil chord-wise axes at various angles relative to the radial members;

(e) said thrust means comprising a power source linked to aerodynamic reaction means mounted by bearing and actuation means on the radial members to pivot with said wing airfoils, a thrust means being paired with each wing airfoil and positioned so that the thrust vector from said aerodynamic reaction means is perpendicular to the axis of the radial members and is in a plane normal to said wing airfoil span-wise axes, whereby the direction of the thrust vector may be adjusted to provide rotation of the airfoil structure, specified in (b) to (e), about the horizontal axis of the aircraft and/or movement in the direction of the horizontal axis of the aircraft, and (f) control means operatively connected with the actuation means specified in (c), (d) and (e) for adjusting said thrust means and airfoils to provide wing cyclic, wing cycloidal, blade cyclic, and blade collective control operatively connected to altitude, attitude, heading and ground relative positions systems linked to a pilot control system.

2. A composite aircraft utilizing at least one system of airfoils, said system referred to as a cyclorotor, each system having substantially horizontal axis of rotation, said airfoil system consisting of two separate sets of airfoils, one set referred to as blades with said blade airfoils extending radially relative to said horizontal axis and characterized by the ability to generate thrust vectors substantially in line with said horizontal axis and the second set of airfoils attached by means of rotatable couplings to the first set of airfoils, said second set of airfoils referred to as wings and characterized by the ability to generate lift vectors in a plane substantially at ninety degrees to said horizontal axis, thrust means directly attached to said airfoils, control means for variation of the angle of attack of both sets of airfoils, independently and with reference to the position of each airfoil relative to the inflow of fluid experienced by the airfoil, and a structural assembly of said aircraft for supporting said system of airfoils with coupling means allowing rotation of the blade airfoils about their span-wise axis with a first rotatable coupling means to allow the wing airfoils to rotate about their span-wise axis for the generation of lift, and a second rotatable coupling means to allow the span-wise axis of the wing airfoils to pivot relative to the horizontal axis of said structure whereby said span-wise axis of said wing airfoils may be established at any position between a position parallel to said horizontal structure or a position in a plane at ninety degrees to said horizontal structure, said cyclorotor or rotors including thrust means whereby said cyclorotor may be rotated about said horizontal axis or, by virtue of said second rotatable coupling means, said thrust means may be oriented thereby to provide thrust vectors substantially parallel to said horizontal axis, said structural assembly operatively attached to a gas-containment envelope for the generation of bouyant lift consisting of an envelope for containing a fluid lighter than the surrounding medium, said envelope including an internal compartment with means to vary the volume of said internal compartment by infusion or exclusion of quantities of the surrounding medium, a pressure control system for controlling the pressure of the fluid lighter than the surrounding medium and compensating for pressures generated by the movement of the said envelope through the surrounding medium wherein the dynamic pressure of movement is sensed and compared to the static pressure of the surrounding medium and this result compared within a logic circuit with the output of said logic circuit used to control the amount of fluid from the surrounding medium within the internal envelope thereby changing the volume of said internal envelope and maintaining a given pressure of the fluid lighter than the surrounding medium, and airfoil control means to provide wing and blade cyclic, collective, cycloidal control operatively connected to altitude, attitude, heading and ground control relative positions systems linked to a pilot control system.

3. A hybrid aircraft comprising in combination a lighter-than-air gas-containment envelope, a structure comprising wing airfoils, blade airfoils, thrust means, linkage means and control means operatively connected characterized as follows:
  (a) a gas-containment envelope for lighter-than-air gas providing bouyant lift comprising an impermeable surface capable of retaining said gas with adequate strength to accept pressure and other leads thereon, said gas-containment envelope containing a volume of said gas with structure means for transferring the bouyant lift of said gas to said structure and capable of lifting at least all structural weight, both aerostatic and aerodynamic, of the aircraft; said gas-containment envelope having contained therein an internal ballonet system for adjusting the lifting gas pressure, said ballonet system comprising an air chamber capable of volume variation within the gas-containment envelope, pumping means for introducing air into the chamber to increase the chamber volume, pressure-sensing means for controlling said pumping means, valve means for retaining the air in the chamber, retraction means for reducing the chamber volume, and relief valve means for releasing air from the chamber to maintain chamber pressure slightly higher than the lifting gas pressure;
  (b) a structure consisting of horizontal members and radial members, operatively connected, said radial members being mounted on the horizontal members in a plane ninety degrees to said horizontal members, said horizontal members being operatively attached to the gas-containment envelope whereby the aerostatic lift of the gas contained within the gas-containment envelope is transferred to the horizontal members, said structure having a control cab;
  (c) said wing airfoils being mounted by bearing and actuation means on the radial members whereby the wing airfoil span-wise axes may be oriented parallel to the horizontal members of the aircraft or whereby said wing airfoils may be rotated to position said span-wise axis of said wing airfoils, in a plane at ninety degrees to the horizontal members and whereby the angle of attack of said wing airfoils may be adjusted to vary lift;
  (d) said blade airfoils being mounted by bearing and actuation means on the radial members with the blade airfoil span-wise axes in a plane at ninety degrees to the horizontal members and whereby said blade airfoils may be rotated to position the blade airfoil chord-wise axes at various angles relative to the radial members;
  (e) said thrust means for generating thrust by reaction comprising a power source linked to aerodynamic reaction means mounted by bearing and actuation means on the radial members to pivot with said wing airfoils, a thrust means being paired with each wing airfoil and positioned so that the thrust vector from said aerodynamic reaction means is perpendicular to the axis of the radial members and is in a plane normal to said wing airfoil span-wise axes, whereby the direction of the thrust vector may be adjusted to provide rotation of the airfoil structure, specified in (b) to (e), about the horizontal axis of the aircraft and/or movement in the direction of the horizontal axes of the aircraft; and
  (f) control means operatively connected with the actuation means specified in (c), (d), and (e) for adjusting said airfoils and said thrust means to provide wing cyclic, wing cycloidal, blade cyclic, and blade collective control operatively connected to altitude, attitude, heading and ground relative position systems linked to a pilot control system.

4. The hybrid aircraft of claim 3 wherein the control cab is mounted on a main horizontal member by bearing means to isolate the control cab from rotation of the aircraft structure.

5. The hybrid aircraft of claim 3 wherein the control cab is located below the aircraft, said control cab being equipped with aerodynamic reaction means for controlling cab movement to counter swaying.

6. In combination with the aircraft of claim 3 wherein the altitude control system consists of,
  (a) means of sensing altitude and generating a signal proportional to altitude with,
  (b) means for applying said signal to the wing cycloidal command through the pilot control system whereby,
  (c) upward movement of said pilot control system will act to command a gain in altitude, (d) a downward movement of the pilot control system will command a loss of altitude, and
(e) a neutral position of said pilot control system will result in no altitude change.

7. In combination with the aircraft of claim 3, wherein the heading control system consists of a means for sensing a compass heading and generating a signal dependent on said compass heading with provision for applying said signal to the cyclic command system of the wings and/or blades through the pilot control system whereby,
  (a) movement to a left position of said pilot control system will cause the wing and/or blade control system to generate a thrust that will cause a change in aircraft heading to the left,
  (b) a movement to a right position of said pilot control system will cause a change in aircraft heading to the right and,
  (c) a neutral position between said left and right position of the pilot control system will result in no heading change of the aircraft.

8. In combination with the aircraft of claim 3, a means of sensing variations in the pitch of the horizontal axis of the aircraft and generating a signal proportional to the horizontal axis of the aircraft relative to a level attitude with means for applying said signal to the wing and/or blade control system though the pilot control system whereby displacement of said pilot control system in a plane through the horizontal axis of said aircraft acts to command a change in pitch of the aircraft and,
  (a) no such displacement of said pilot control system will result in a maintenance of a level attitude of said aircraft.

9. In combination with the aircraft of claim 3, means for generation of appropriate modulation of the wing cyclic command signal by displacement of the pilot control system in a plane at ninety degrees to the horizontal axis of said aircraft so that such displacement of said pilot control system will act to generate a thrust from the wings in the direction of said pilot control displacement.

10. In combination with the aircraft of claim 3, means for controlling said blade control system by displacement of the pilot control system directly in line with the horizontal axis of said aircraft, with,
  (a) a neutral position commanding zero thrust,
  (b) a position forward of neutral commanding a forward thrust,
  (c) a position rearward of neutral commanding a rearward thrust.

* * * * *